United States Patent [19]
Nohr et al.

[11] Patent Number: 5,455,074
[45] Date of Patent: Oct. 3, 1995

[54] LAMINATING METHOD AND PRODUCTS MADE THEREBY

[75] Inventors: Ronald S. Nohr, Roswell; John G. MacDonald, Decatur, both of Ga.

[73] Assignee: Kimberly-Clark Corporation, Neenah, Wis.

[21] Appl. No.: 997,799

[22] Filed: Dec. 29, 1992

[51] Int. Cl.⁶ .............................. B05D 3/00; B32B 27/00
[52] U.S. Cl. ................ 427/386; 427/388.5; 427/389.8; 427/389.9; 427/392; 427/379; 427/372.2; 428/934; 428/224; 428/246
[58] Field of Search .......................... 427/54.1, 55, 335, 427/337, 385.5, 386, 388.5, 389.8, 389.9, 392, 379, 372.2; 522/31; 428/934, 274, 246

[56] References Cited

U.S. PATENT DOCUMENTS

| | | | |
|---|---|---|---|
| 3,016,599 | 1/1962 | Perry, Jr. | 28/78 |
| 3,341,394 | 9/1967 | Kinney | 161/72 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1074 | Porte | 156/73.76 |
| 3,978,185 | 8/1976 | Buntin et al. | 264/93 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,250,006 | 2/1981 | Guarnery et al. | 204/159.18 |
| 4,340,563 | 7/1982 | Appel et al. | 264/518 |
| 4,405,297 | 9/1983 | Appel et al. | 425/72 |
| 4,434,204 | 2/1984 | Hartman et al. | 428/198 |
| 4,627,811 | 12/1986 | Greiser et al. | 425/72 |
| 4,644,045 | 2/1987 | Fowells | 526/348 |
| 4,663,220 | 5/1987 | Wisneski et al. | 428/288 |
| 4,975,300 | 12/1990 | Deviny | 427/54.1 |
| 4,977,199 | 12/1990 | Koleske et al. | 522/31 |

FOREIGN PATENT DOCUMENTS

| | | | |
|---|---|---|---|
| 0249200 | 12/1987 | European Pat. Off. | C09D 3/58 |
| 0249201 | 12/1987 | European Pat. Off. | C09D 3/58 |
| 3314896 | 10/1983 | Germany | C08J 3/24 |
| 3822297 | 1/1990 | Germany | B29D 9/00 |
| WO9014949 | 12/1990 | WIPO | B32B 31/08 |

OTHER PUBLICATIONS

Patent Abstracts of Japan, vol. 16, No. 343 (M–1285) 24 Jul. 1992 & JP–A–04 103 339 (Fujitsu Ltd.) 6 Apr. 1992 (Abstract).

(List continued on next page.)

*Primary Examiner*—Patrick J. Ryan
*Assistant Examiner*—Richard P. Weisberger
*Attorney, Agent, or Firm*—William E. Maycock

[57] ABSTRACT

A method of preparing a laminate having increased peel strength and solvent resistance which involves (A) applying an adhesive composition to a surface of a first sheet; (B) exposing the adhesive composition on the surface of the first sheet to incoherent, pulsed ultraviolet radiation from a dielectric barrier discharge excimer lamp; (C) bringing a surface of a second sheet in contact with the adhesive composition-bearing surface of the first article; and (D) allowing the adhesive composition to cure. The incoherent, pulsed ultraviolet radiation has a single narrow wavelength band within the range of from about 260 to about 360 nanometers. The adhesive composition includes from about 94 to about 60 percent by weight of a cycloaliphatic diepoxide, from about 1 to about 10 percent by weight of a cationic photoinitiator, and from about 5 to about 30 percent by weight of a vinyl chloride-vinyl acetate-vinyl alcohol terpolymer, all based on the weight of adhesive composition. The sheets desirably are films and nonwoven webs composed of cellulosic fibers, polyolefin fibers, or a mixture of cellulosic fibers and polyolefin fibers. The method is particularly well suited for the preparation of such laminates as industrial wipers, workwear, medical fabrics, and the like.

20 Claims, 7 Drawing Sheets

U.S. PATENT DOCUMENTS

Database WPI, Week 8151, Derwent Publications Ltd. London, GB; AN 81-93899D & JP-A-56 143 222 (Sumitomo Chemical KK) 7 Nov. 1981 (Abstract).

E. Eliasson & U. Kogelschatz, "UV Excimer Radiation From Dialectric-Barrier Discharges", Appl. Phys. B, 46, pp. 299-303 (1988).

V. A. Wente "Superfine Thermoplastic Fibers", *Industrial and Engineering Chemistry*, vol. 48, No. 8, pp. 1342-1346 (1956).

V. A. Wente et al., "Manufacture of Superfine Organic Fibers", Navy Research Laboratory, Washington, D.C., NRL Rpt. 4364 (111437) dtd May 25, 1954, U.S. Dept of Commerce, Office of Technical Services.

Robert R. Butin and Dwight T. Lohkamp, "Melt Blowing—A One-Step Web Process for New Nonwoven Products", *Journal of the Technical Assoc. of the Pulp and Paper Ind.* vol. 56, No. 4, pp. 74-77 (1973).

U. Kogelschatz, "Silent Discharges For The Generation of Ultraviolet and Vacuum Ultraviolet Excimer Radiation", *Pure & Appl. Chem.* 62, No. 9, pp. 1667-1674.

LAMINATING METHOD AND PRODUCTS MADE THEREBY

BACKGROUND OF THE INVENTION

The present invention relates to laminates. More particularly, the present invention relates to a method of making a laminate and to the product prepared by such method, e.g., a laminate having increased peel strength and improved solvent resistance.

Laminates are used in a variety of products, including industrial wipers, workwear, medical fabrics, and the like. Such laminates typically consist of two or more layers of sheet materials which are bonded together by some means. In some cases, the layers making up the laminate are thermally point bonded. In other cases, the layers are bonded together by an adhesive. For example, some disposable industrial wipers consist of an inner layer of a polypropylene spunbonded web and two outer tissue layers. The outer tissue layers are bonded to the inner layer by an adhesive which is applied as an emulsion and thermally cured. However, such wiper laminates exhibit poor interlayer adhesion as indicated by low peel strengths and little or no resistance to organic solvents. While the adhesional properties could be improved by increasing the amount of adhesive and/or through the use of radiation curing, the resulting laminates would be less flexible and less soft, and would suffer a loss of other desirable properties, e.g., such surface characteristics as water wettability. Consequently, there is a need for an improved adhesive-based bonding method which overcomes such problems.

SUMMARY OF THE INVENTION

It therefore is an object of the present invention to provide a method of preparing a laminate.

It is another object of the present invention to provide a laminate having improved properties.

These and other objects will be readily apparent to one having ordinary skill in the art from a consideration of the specification and claims which follow.

Accordingly, the present invention provides a method of preparing a laminate composed of at least two layers of sheet materials which involves:

(A) applying an adhesive composition to a surface of a first sheet material;

(B) exposing the adhesive composition on the surface of the first sheet material to incoherent, pulsed ultraviolet radiation from a dielectric barrier discharge excimer lamp;

(C) bringing a surface of a second sheet material in contact with the adhesive composition-bearing surface of the first sheet material; and (D) allowing the adhesive composition to cure; in which:
  (1) the incoherent, pulsed ultraviolet radiation has a single narrow wavelength band within the range of from about 260 to about 360 nanometers; and
  (2) the adhesive composition comprises from about 94 to about 60 percent by weight of a cycloaliphatic diepoxide, from about 1 to about 10 percent by weight of a cationic photoinitiator, and from about 5 to about 30 percent by weight of a vinyl chloride-vinyl acetate-vinyl alcohol terpolymer, all based on the weight of adhesive composition.

The present invention also provides a method of preparing a laminate composed of three layers of sheet materials which involves:

(A) providing a first sheet material having a first surface and a second surface;

(B) applying an adhesive composition to each of the first surface and the second surface of the first sheet material;

(C) exposing the adhesive composition on each of the first surface and the second surface of the first sheet material to narrow-band ultraviolet radiation from a dielectric barrier discharge excimer lamp;

(D) bringing a surface of a second sheet material in contact with the adhesive composition-bearing first surface of the first sheet material;

(E) bringing a surface of a third sheet material in contact with the adhesive composition-bearing second surface of the first sheet material; and (D) allowing the adhesive composition to cure; in which:
  (1) the incoherent, pulsed ultraviolet radiation has a single narrow wavelength band within the range of from about 260 to about 360 nanometers; and
  (2) the adhesive composition comprises from about 94 to about 60 percent by weight of a cycloaliphatic diepoxide, from about 1 to about 10 percent by weight of a cationic photoinitiator, and from about 5 to about 30 percent by weight of a vinyl chloride-vinyl acetate-vinyl alcohol terpolymer, all based on the weight of adhesive composition.

In certain desired embodiments, the sheet materials are films or fibrous sheet materials. In other desired embodiments, films are polyolefin films. In yet other desired embodiments, fibrous sheet materials are composed of cellulosic fibers, polyolefin fibers, or a combination of cellulosic fibers and polyolefin fibers.

DETAILED DESCRIPTION OF THE INVENTION

As used herein, the term "sheet material" means any material in the form of a sheet. The term "sheet" means only that the thickness of the material is substantially smaller than either the width or length of the material. A sheet material can be rigid or flexible, with the latter being desired.

Desirably, a sheet material will be either a film or a fibrous sheet material. The desired films are prepared from a polyolefin. The desired fibrous sheet materials include nonwoven webs comprised of cellulosic fibers, polyolefin fibers, or a mixture of cellulosic fibers and polyolefin fibers. Such desired fibrous sheet materials typically are selected from the group consisting of tissue webs, meltblown webs, coformed webs, and spunbonded webs.

Tissue webs are prepared in accordance with well-known paper-making techniques. Typical references for the preparation of meltblown, coformed, and spunbonded webs are given below.

(a) meltblowing references include, by way of example,

U.S. Pat. Nos. 3,016,599 to Perry, Jr., 3,704,198 to Prentice, 3,755,527 to Keller et al., 3,849,241 to Butin et al., 3,978,185 to Butin et al., and 4,663,220 to Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. Nos. 4,100,324 to Anderson et al. and 4,118,531 to Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

The term "polyolefin" is used herein to mean any thermoplastic polyolefin which can be used for the preparation of nonwoven webs. Examples of thermoplastic polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. In addition, such term is meant to include blends of two or more polyolefins and random and block copolymers prepared from two or more different unsaturated monomers. Because of their commercial importance, the most preferred polyolefins are polyethylene and polypropylene.

The thickness or basis weight of any given sheet material is not known to be critical. In fact, the method of the present invention is independent of the thickness of a sheet material. As a practical matter, however, the more desired flexible films and fibrous sheet materials typically will have basis weights in the range of from about 10 to about 115 grams per square meter (g/m$^2$).

The term "incoherent, pulsed ultraviolet radiation" has reference to the radiation produced by a dielectric barrier discharge excimer lamp (referred to hereinafter as "excimer lamp"). Such a lamp is described, for example, by U. Kogelschatz, "Silent discharges for the generation of ultraviolet and vacuum ultraviolet excimer radiation," *Pure & Appl. Chem.*, 62, No. 9, pp. 1667–1674 (1990); and E. Eliasson and U. Kogelschatz, "UV Excimer Radiation from Dielectric-Barrier Discharges," *Appl. Phys. B*, 46, pp. 299–303 (1988). Excimer lamps were developed by ABB Infocom Ltd., Lenzburg, Switzerland.

The excimer lamp emits radiation having a very narrow bandwidth, i.e., radiation in which the half width is of the order of 5–15 nanometers. This emitted radiation is incoherent and pulsed, the frequency of the pulses being dependent upon the frequency of the alternating current power supply which typically is in the range of from about 20 to about 300 kHz. An excimer lamp typically is identified or referred to by the wavelength at which the maximum intensity of the radiation occurs, which convention is followed throughout this specification and the claims. Thus, in comparison with most other commercially useful sources of ultraviolet radiation which typically emit over the entire ultraviolet spectrum and even into the visible region, excimer lamp radiation is essentially monochromatic.

Excimers are unstable molecular complexes which occur only under extreme conditions, such as those temporarily existing in special types of gas discharge. Typical examples are the molecular bonds between two rare gaseous atoms or between a rare gas atom and a halogen atom. Excimer complexes dissociate within less than a microsecond and, while they are dissociating, release their binding energy in the form of ultraviolet radiation.

While excimers in general emit in the range of from about 125 to about 360 nanometers, depending upon the excimer gas mixture, only those which emit in the range of from about 260 to about 360 nanometers are of interest in the present invention. Thus, the incoherent, pulsed ultraviolet radiation having utility in the present invention has a single narrow wavelength band within the range of from about 260 to about 360 nanometers. The adhesive composition, particularly the cycloaliphatic diepoxide component, begins to absorb at a wavelength of about 260 nanometers. Thus, at wavelengths lower than about 260 nanometers, the absorbance of the adhesive composition reduces the availability of photons to unacceptably low levels. As a practical matter, a xenon chloride excimer which emits at a wavelength of 308 nanometers has been found to be particularly well suited for the present invention. However, other excimers which emit in the range of from about 260 to about 360 nanometers can be used, if desired.

The adhesive composition in general comprises from about 94 to about 60 percent by weight of a cycloaliphatic diepoxide, from about 1 to about 10 percent by weight of a cationic photoinitiator, and from about 5 to about 30 percent by weight of a vinyl chloride-vinyl acetate-vinyl alcohol terpolymer, all based on the weight of adhesive composition.

As used herein, the term "cycloaliphatic diepoxide" means an organic compound or material having two oxirane rings in each molecule, which oxirane rings must be part of a cycloaliphatic moiety. While both of such oxirane rings theoretically can be part of the same cycloaliphatic moiety, it is more favorable sterically when each oxirane ring is part of a separate cycloaliphatic moiety. While the cycloaliphatic moiety is not known to be critical, it most often will be a $C_5$–$C_8$ cycloaliphatic moiety, with cyclohexyl ($C_6$) and cycloheptyl ($C_7$) moieties being especially desired. Cyclohexyl diepoxides are particularly useful in the present invention. Examples of especially desired cyclohexyl diepoxides include, by way of illustration only, 3,4-epoxycyclohexyl-methyl-3,4-epoxycyclohexane carboxylate and bis-(3,4-epoxycyclohexyl) adipate. Such materials are available from Union Carbide Chemicals and Plastics Company, Inc., Danbury, Conn., as CYRACURE® UVR-6100, UVR-6105, and UVR-6110, and CYRACURE® UVR-6128, respectively. The term is meant to include both a single cycloaliphatic diepoxide and a mixture of two or more different cycloaliphatic diepoxides.

The adhesive composition also must contain a cationic photoinitiator in an amount of from about 1 to about 10 percent by weight, based on the amount of adhesive composition. Although the nature of the cationic photoinitiator is not known to be critical, arylsulfonium salts are desired, with triarylsulfonium salts being particularly desired. The anion associated with the cationic photoinitiator in general can be any anion capable of forming a superacid, i.e., the protonated anion. When the photoinitiator is a triarylsulfonium salt, the more common anions are the hexafluoroantimonate and hexafluorophosphate ions. Especially useful cationic photoinitiators are the CYRACURE® UVI-6974 and UVI-6990 photoinitiators (Union Carbide Chemicals and Plastics Company, Inc.).

The adhesive composition additionally must contain from about 5 to about 30 percent by weight, based on the weight of the adhesive composition, of a vinyl chloride-vinyl acetate-vinyl alcohol terpolymer. When terpolymer is present, the amount of cycloaliphatic diepoxide present in the adhesive composition typically will be in the range of from about 94 to about 60 percent by weight, based on the weight of the adhesive composition. Terpolymer can be obtained from Union Carbide Chemicals and Plastics Company, Inc. under the trade name, UCAR® Solution Vinyl Resins.

The terpolymer in general will have vinyl chloride as the major constituent; that is, the amounts of vinyl acetate and vinyl alcohol present in the terpolymer usually will be less than 10 percent by weight each, based on the weight of the terpolymer. A typical composition is 90 percent by weight vinyl chloride, 4 percent by weight vinyl acetate, and 6 percent by weight vinyl alcohol, all based on the weight of the terpolymer, e.g., UCAR® VAGH resin, which has a number average molecular weight of 27,000, and UCAR® VAGD resin, which has a number average molecular weight of 22,000. The terpolymer functions both as a chain transfer agent and a viscosity builder. It contributes to adhesive flexibility and accelerates the kinetics of the curing process.

Although not particularly desired, the adhesive composition can contain minor amounts of other materials or components, such as diluents, flexibilizers, surfactants, cure accelerators, pigments, fillers, and the like, although basic or alkaline substances should be avoided. Examples of some of such materials include, by way of illustration only, alcohols, glycols, glycol ethers, cycloaliphatic epoxides, long chain epoxyalkanes, caprolactone diols, caprolactone triols, and the like.

The amount of adhesive composition which is applied to a surface of a sheet material in accordance with the present invention in general is a function of the degree of adhesion required and the properties of the resulting laminate. The amount of adhesive composition so applied needs to be sufficient to achieve the proper adhesion of one sheet to another. However, high amounts of adhesive composition can adversely affect the hand or feel of the laminate. As a practical matter, the amount of adhesive composition applied to any given surface of a sheet material will be in the range of from about 1 to about 15 g/m$^2$. Desirably, such amount of adhesive will be in the range of from about 2 to about 10 g/m$^2$, and more desirably in the range of from about 4 to about 8 g/m$^2$.

The means by which adhesive composition is applied to a surface is not critical. For example, the adhesive composition can be applied by spraying, doctor blade, printing, silk-screening, and the like. Because the adhesive composition employed in the present invention is far superior to previously used adhesives, lower amounts can be applied to achieve satisfactory adhesion.

An especially desirable means for applying the adhesive composition to a surface of a sheet material is a printing procedure. Typical examples of suitable printers are direct and offset gravure printers or coaters. The offset gravure coater has the advantage of allowing better control over the amount of adhesive composition applied, especially when low levels are desired. In either case, the adhesive composition is picked up by an etched or engraved gravure or furnish roll. In a direct gravure coater, the adhesive composition is transferred directly to a surface of a sheet material. In the offset gravure coater, the adhesive composition picked up by the gravure roll is transferred to a rubber-covered application or offset roll which in turn transfers the adhesive composition to a surface of a sheet material. Alternatively, a knurled roll can be installed between the furnish roll and the offset roll, in which case both the furnish roll and the offset roll are rubber covered. The surface area and depth of the recesses in the knurled roll determine the amount of adhesive composition that is transferred to a surface of a sheet material and ensure uniform distribution across the coater.

An offset gravure coating process was found to be especially useful for applying adhesive composition to surfaces of sheet materials. A engraved furnish roll was employed. A particularly useful engraving consisted of spirally cut groves. When adhesive composition is to be applied to both surfaces of a given sheet material, it is advantageous to have such spirally cut groves oriented in a manner such that the lines of adhesive composition applied to one side of a sheet material are not parallel to the lines of adhesive composition applied to the other side of the same sheet material. Desirably, the lines of adhesive composition applied to one side of a sheet material will be at an angle of from about 45° to about 90° to the lines of adhesive composition applied to the other side of the same sheet material. Of course, other patterns can be employed without limitation, if desired. Alternatively, a smooth furnish roll can be employed.

When a sheet material, whether a film or a fibrous sheet material, is composed predominantly of a polyolefin, it is desirable to oxidize the surfaces thereof for better wetting by the adhesive composition. Although such oxidation can generally be accomplished by any suitable means, it is particularly convenient to subject such sheet material to corona discharge. In general, the corona discharge power density should be sufficient to oxidize the surfaces of a polyolefin sheet material to ensure the wettability of its surfaces by the adhesive composition. As a practical matter, corona discharge power densities of from about 2 to about 10 kilowatts per square meter (kW/m$^2$) have proven satisfactory.

Once adhesive composition has been applied to a surface of a sheet material, it is exposed to incoherent, pulsed ultraviolet radiation from a dielectric barrier discharge excimer lamp. The sheet materials which are to form the laminate then are brought together, typically in a nip. The adhesive composition is irradiated before bringing the sheet materials together in order to avoid the scattering of ultraviolet radiation by the outer sheet materials.

The power density per surface of the incoherent, pulsed ultraviolet irradiation typically will be in the range of from about 4 to about 20 joules per square meter (J/m$^2$). However, such range in reality merely reflects the capabilities of current excimer lamp power supplies; in the future, higher power densities may be practical.

It would be expected by those having ordinary skill in the art that for a given ultraviolet radiation exposure period, the higher ultraviolet radiation power density source should give a higher cure rate, thereby resulting in better adhesion. Contrary to this expectation, however, the opposite was found to be the case for the present invention. Thus, the excellent adhesion between sheet materials which can be achieved by the present invention, as evidenced by high peel strengths, was unexpected. This is true even though the more desired cationic photoinitiators, i.e., the triarylsulfonium salts, have an absorbance maximum at 308 nanometers. It must be kept in mind that initiating efficiency is not related to high absorbance, but rather to the product of the absorbance times the quantum yield at that wavelength.

The amount of incoherent, pulsed ultraviolet radiation to which any given adhesive-bearing surface of a sheet material is exposed is largely a function of line speed. While the intensity of the radiation emitted by the excimer lamps can be varied by varying the power supplied to the lamps, this is not a practical means of controlling irradiation amounts because of the relatively low output of the lamps, even at maximum power input. Therefore, as a practical matter, irradiation levels are better controlled by means of the line speed. Thus, decreasing the line speed increases the time a sheet material is under excimer lamps and, as a consequence, increases the amount of incoherent, pulsed ultraviolet radiation received by the sheet material per unit area.

Another important factor is the distance of the excimer lamps from the nip, referred to hereinafter as the lamp-to-nip distance. As is known in the adhesive art, the curing of cationic, ultraviolet-curable adhesives containing oxirane rings and polyols continues after the initial exposure to ultraviolet radiation. That is, the superacid generated from the cationic photoinitiator during ultraviolet exposure continues to be active after exposure. Thus, the originally non-tacky adhesive composition continues to develop tack after exposure. The degree of tack at the nip can be controlled to some extent by the simple expedient of varying the lamp-to-nip distance. Thus, increasing such distance increase the tack of the adhesive composition at the nip. This ability to at least partially control the degree of tack at the nip contributes significantly to the control of the method of the present invention and the quality of the resulting laminate.

As a general rule, the distance of the excimer lamp from a sheet material will be of the order of 1 cm, although this distance is not known to be critical. The lamp-to-nip distance will to a large degree be dependent upon the apparatus; however, as noted in the examples, the distance of the excimer lamp closest to the nip was around 12–15 cm.

Excimer lamps conveniently are organized in banks of four cylindrical lamps which can be of any convenient length, currently up to about 1 meter. However, the geometry of the lamps is not limited to cylinders. The lamps are cooled by circulating water through a centrally located or inner tube of the lamp and, as a consequence, they operate at a relatively low temperature, i.e., about 50° C. Nevertheless, the lamps are compact and easily inserted at almost any convenient point in an apparatus. Desirably, such lamps should be adjustable, such that the distance of the lamps from the adhesive-bearing surface of a sheet material and the distance of the lamps from the nip where the two or more sheet materials are brought together to form the laminate can be varied.

The present invention is further described by the examples which follow. Such examples, however, are not to be construed as limiting in any way either the spirit or the scope of the present invention. In the examples, all temperatures are in degrees Celsius and all parts are parts by weight unless specified otherwise.

Examples 1–13

A number of laminates were prepared, each of which had a center or inner sheet material, to each surface of which was bonded an outer tissue sheet material. While the center sheet varied, each outer sheet material was a tissue nonwoven web having a basis weight of about 23 $g/m^2$.

Two different center sheet materials were employed. Center sheet material A was a polypropylene spunbonded web having a basis weight of about 15 $g/m^2$. Center sheet material B was a polypropylene film having a basis weight of about 37 $g/m^2$.

In each case, the adhesive composition consisted of:
(a) 82 percent by weight of CYRACURE® UVR-6110 cycloaliphatic diepoxide described earlier;
(b) 3 percent by weight of photoinitiator, CYRACURE® UVI-6990 triarylsulfonium hexafluorophosphate salts described earlier; and
(c) 15 percent by weight of the UCAR® VAGH vinyl chloride-vinyl acetate-vinyl alcohol terpolymer having a number average molecular weight of 27,000 described earlier.

The adhesive composition was prepared by heating the cycloaliphatic diepoxide to about 50° and adding the cationic photoinitiator with stirring. The mixture was stirred until the cationic photoinitiator had dissolved, at which time the terpolymer was added, also with stirring.

In order to illustrate the importance of the excimer lamp in the present invention, ultraviolet radiation alternatively was provided by a microwave discharge mercury fusion lamp system, specifically an H-Bulb F-300 System manufactured by Fusion UV Curing Systems, Rockville, Md.

Figure 1:
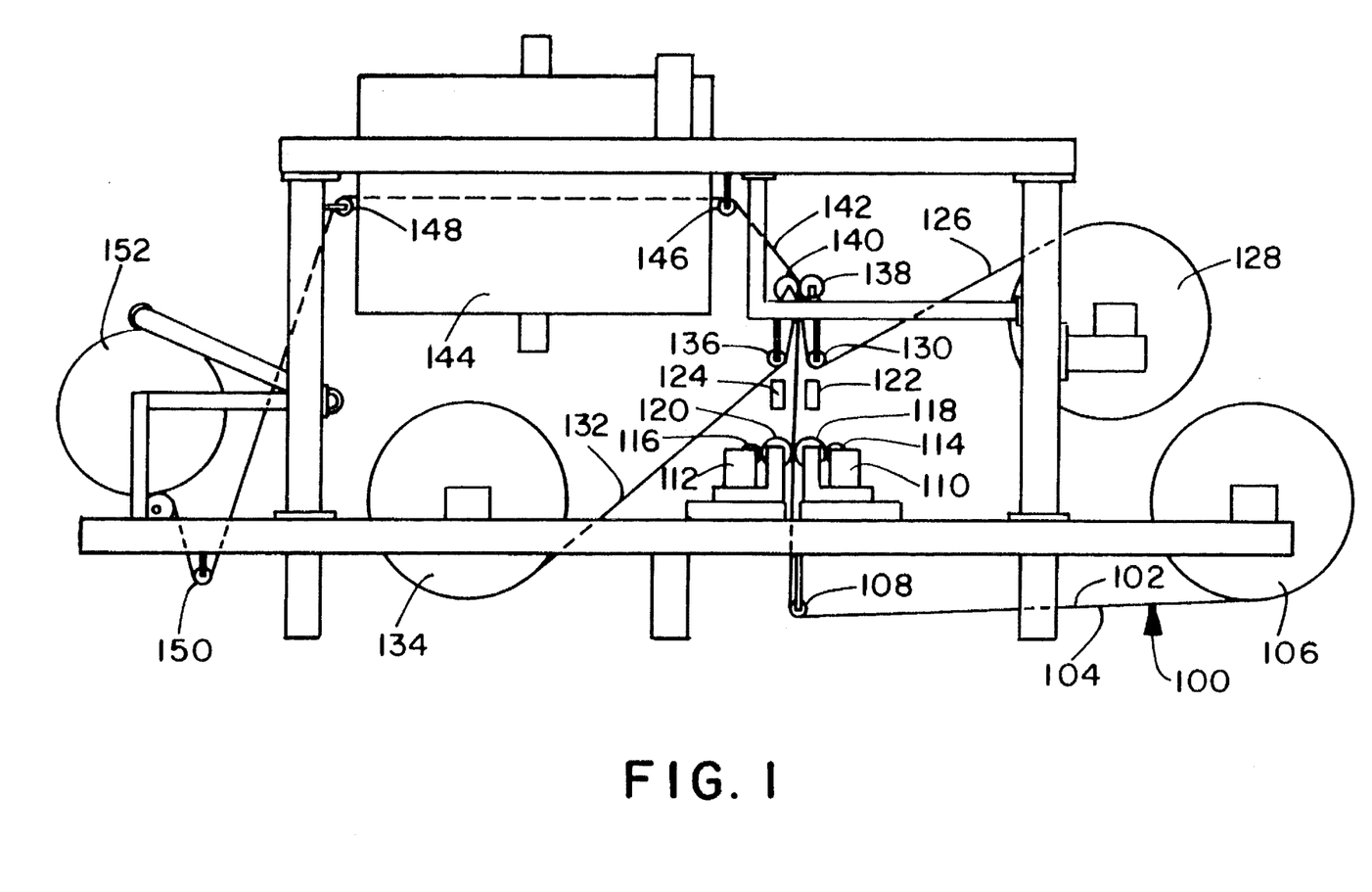
FIG. 1 is a schematic diagram of the apparatus employed in Examples 1, 2, 5, 6, 9, and 10.

The apparatus employed with the excimer lamps is shown in FIG. 1. With reference to FIG. 1, first sheet material 100 having first surface 102 and second surface 104 was unwound from supply roll 106 and directed around guide roll 108 in an upward direction. Adhesive composition in supply troughs 110 and 112 was picked up by engraved gravure rolls 114 and 116. Adhesive composition then was transferred from gravure roll 114 to offset roll 118 which in turn transferred adhesive composition to first surface 102 of first sheet material 100. Similarly, and simultaneously, adhesive composition was transferred from gravure roll 116 to offset roll 120 which in turn transferred adhesive composition to second surface 104 of first sheet 100. Each of gravure rolls 118 and 120 was engraved with spiral groves as described earlier. First sheet material 100, now having adhesive composition-bearing first and second surfaces, was passed between two excimer lamp assemblies 122 and 124. Each assembly consisted of four cylindrical lamps as described hereinabove. The excimer lamps emitted incoherent, pulsed ultraviolet radiation having a wavelength of 308 nanometers. Excimer lamp assemblies 122 and 124 were mounted in a manner such that they could be moved closer to and further away from first sheet 100 and closer to and further away from nip rolls 138 and 140. The lamp-to-nip distance in general was in the range of from about 12 to about 15 cm, although lesser or greater distances can be used.

Second sheet material 126 was unwound from supply roll 128 and directed in an upwardly direction around guide roll 130. Similarly, third sheet material 132 was unwound from supply roll 134 and directed in an upwardly direction by guide roll 136. Second sheet material 126 was pressed against adhesive composition bearing first surface 102 of first sheet material 100 and third sheet material 132 was pressed against adhesive composition-bearing second surface 104 of first sheet material 100 by means of nip rolls 138 and 140 to form laminate 142. The resulting laminate 142 was directed through oven 144 by guide roll 146 and, as it exited oven 144, in a downward direction by guide roll 148. Laminate 142 then was directed around guide roll 150 and onto take-up roll 152. Oven 144 was left off. That is, no heat was applied to the laminate to aid in the curing of the adhesive composition. The line speed typically varied from about 10 to about 30 meters per minute and the width of each of the sheet materials was about 30 cm.

For the fusion lamp system, adhesive composition was applied to one surface or side of a 10-cm square sample (10 cm per side), using an Euclid Tool Company offset printer (Euclid Tool Company, Bay City, Mich.). The sample was placed, adhesive composition-bearing side up, on the belt of a standard conveyer belt unit which was moving at 30 meters per minute. The adhesive-bearing surface then was exposed to the radiation from the fusion lamp mounted on the belt unit 3 cm above the conveyer belt. A tissue sheet of the same size was applied manually and the resulting laminate passed through an Atlas Wringer having a 4.5-kg nip pressure. The procedure was repeated for the other side of the sample in order to obtain the desired three-layer laminate.

Each laminate was tested for peel strength and solvent resistance. Peel strength was determined with an Instron Model 1122 Universal Testing Instrument (Instron Corporation, Canton, Mass.). Each sample was 76 mm wide and about 130 mm long. One outer layer was carefully peeled manually from the center layer across the width of the sample for a distance sufficient to permit gripping the peeled layer in the jaws of the Instron. The end from which an outer layer had been peeled was gripped in the lower jaws of the Instron. The peeled layer in turn was gripped in the upper jaws. The clamp-in distance was 100 mm. The force required to separate the one layer from the laminate was measured in grams and given a numerical rating in accordance with Table 1.

TABLE 1

Peel Test Criteria

| Force | Rating | Description |
|---|---|---|
| <80 g | 5 | Failed |
| >80 g and <160 g | 4 | Passed (just sufficient) |
| >160 g and <240 g | 3 | Satisfactory |
| >240 g and <320 g | 2 | Good |
| >320 g | 1 | Very good (excellent) |

The solvent resistance test consisted of simply soaking a sample of a laminate for five minutes in each of four solvents: water, diesel, isopropanol, and turpentine (white spirit). Diesel consisted of a $C_9$–$C_4$ hydrocarbon mixture. Each sample then was given a numerical rating in accordance with Table 2.

TABLE 2

Solvent Resistance Criteria

| Rating | Description |
|---|---|
| 5 | No tack remaining in the adhesive; laminate layers separate spontaneously |
| 4 | Some tack remaining in the adhesive (layers do not slide against one another in use) |
| 3 | The solvent had only a minor effect |
| 2 or 1 | The adhesive fully resisted the solvent |

The laminates thus prepared are summarized in Table 3, below (for convenience, the excimer lamp is identified in the table by "EL"). In the table, the adhesive add-on column gives the total amount of adhesive applied to both surfaces of the center sheet material. Example 13 is a control laminate in which the adhesive was a thermally cured emulsion adhesive (in the table, "N/A" means "Not Applicable"). The results of the peel and solvent resistance tests are summarized in Table 4, in which i-PrOH represents isopropanol and Turp. represents turpentine (a "–" indicates that a measurement was not made). A range in Table 4 for the peel test results represents the low and high values of a plurality of tests; the rating is based on the high value of the range.

TABLE 3

Summary of Laminates of Examples 1–13

| Example | Center Web | Adhesive Add-On (g/m²) | UV Source | Power Density (J/m²) | Exposure Time (seconds) |
|---|---|---|---|---|---|
| 1 | A | 5 | EL | 4 | 0.3 |
| 2 | A | 5 | EL | 4 | 0.8 |
| 3 | A | 5 | Fusion | 15 | 0.3 |
| 4 | A | 5 | Fusion | 15 | 0.8 |
| 5 | A | 10 | EL | 4 | 0.3 |
| 6 | A | 10 | EL | 4 | 0.8 |
| 7 | A | 10 | Fusion | 15 | 0.3 |
| 8 | A | 10 | Fusion | 15 | 0.8 |
| 9 | B | 5 | EL | 4 | 0.3 |
| 10 | B | 10 | EL | 4 | 0.3 |
| 11 | B | 5 | Fusion | 15 | 0.3 |
| 12 | B | 10 | Fusion | 15 | 0.3 |
| 13 | A | 15 | N/A | N/A | N/A |

TABLE 4

Summary of Test Results with Laminates of Examples 1–13

| | Peel Strength | | Solvent Resistance | | | |
|---|---|---|---|---|---|---|
| Example | (g) | Rating | Water | Diesel | i-PrOH | Turp. |
| 1 | 175–225 | 3 | — | — | — | — |
| 2 | 200–400 | 1 | — | — | — | — |
| 3 | <100 | 4 | — | — | — | — |
| 4 | <100 | 4 | — | — | — | — |
| 5 | 340–410 | 1 | 1 | 2 | 4 | 3 |
| 6 | 325–400 | 1 | 1 | 2 | 4 | 3 |
| 7 | 190–220 | 3 | — | — | — | — |
| 8 | 175–210 | 3 | — | — | — | — |
| 9 | 280–320 | 2 | — | — | — | — |
| 10 | >600 | 1 | 1 | 1 | 4 | 3 |
| 11 | 140–165 | 4 | — | — | — | — |
| 12 | 255–285 | 2 | — | — | — | — |
| 13 | 175–225 | 3 | 5 | 5 | 5 | 5 |

From the data in Tables 3 and 4, it is clear that the method of the present invention results in significant improvements in both peel strength and solvent resistance at lower levels of both adhesive composition and power density. As already noted, this result was unexpected in view of experiences with other commercially available ultraviolet radiation sources.

Figure 2:
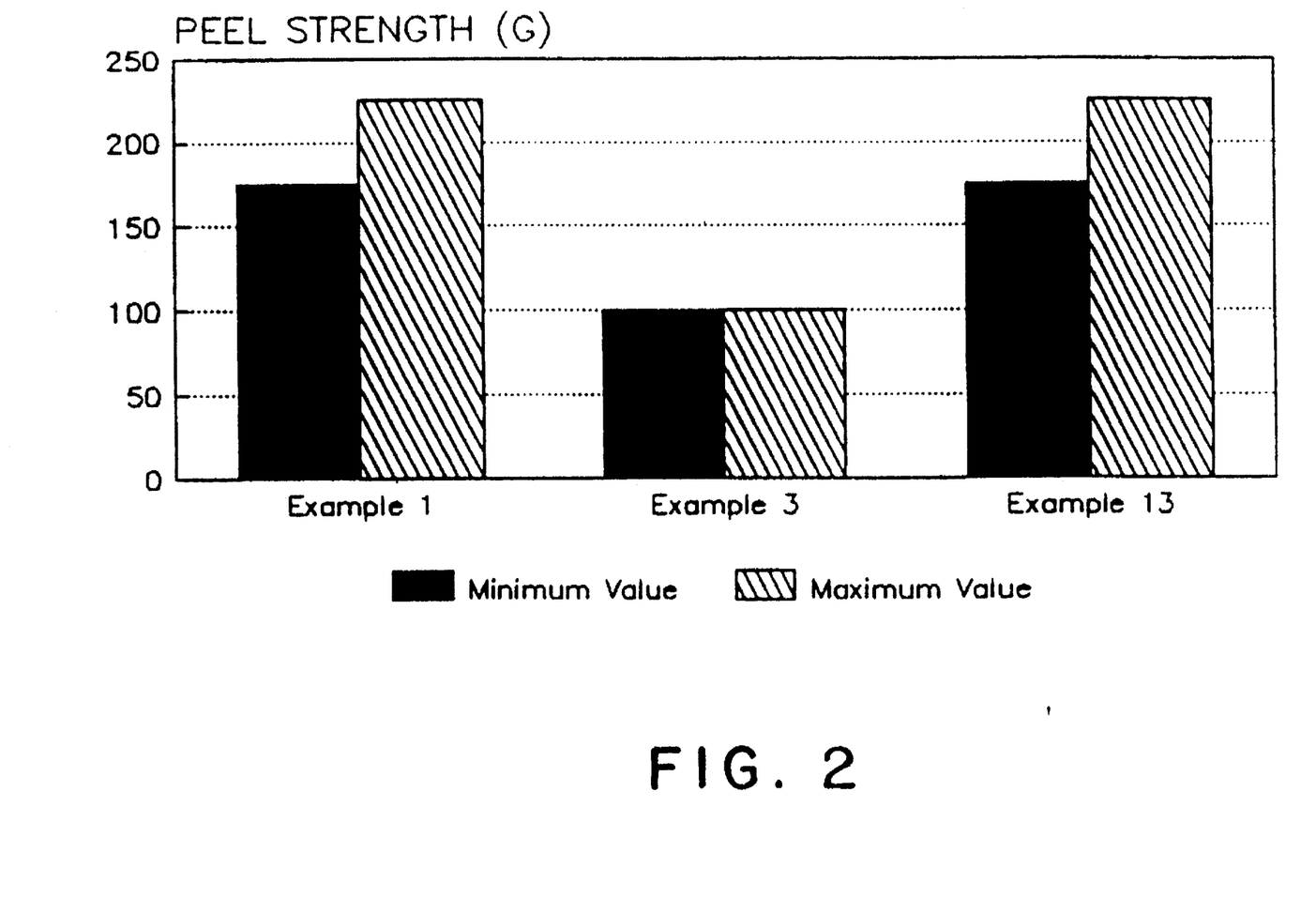
FIGS. 2–7, inclusive, are bar graphs comparing the peel strengths of laminates prepared in accordance with the present invention with laminates prepared with a fusion lamp and, in FIGS. 2–5, inclusive, also with a laminate made with a thermally cured adhesive.
Figure 3:
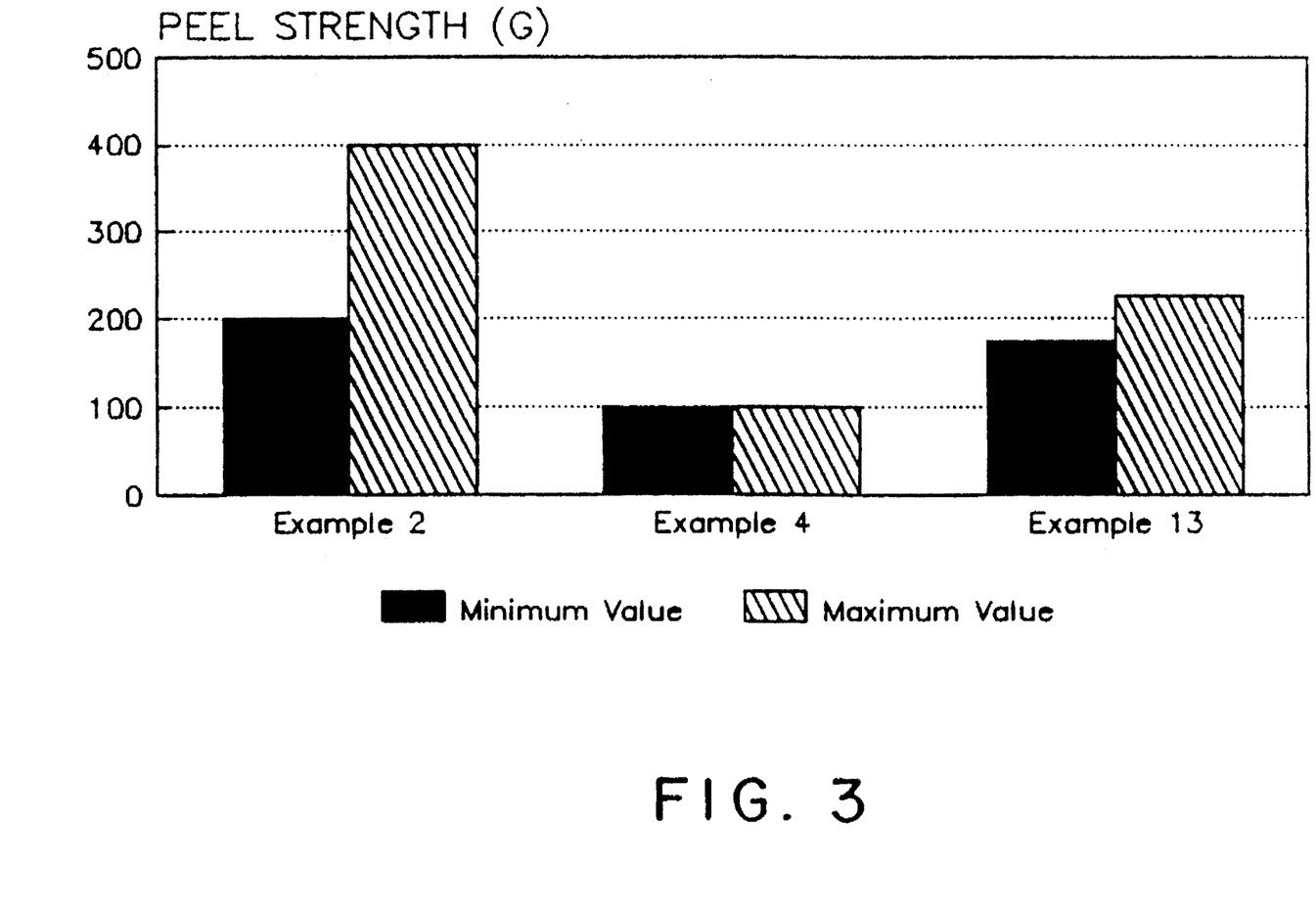
Figure 4:
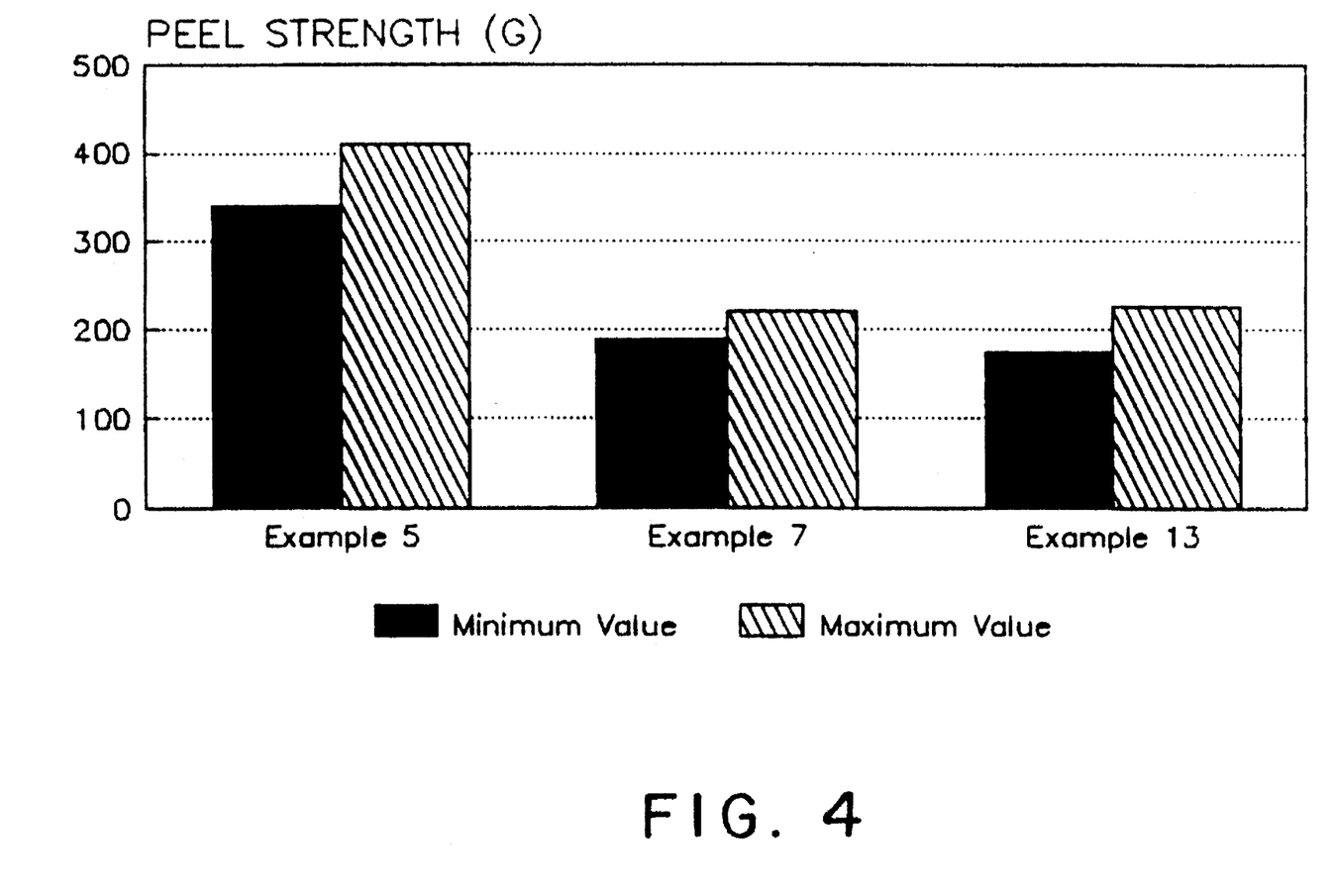
Figure 5:
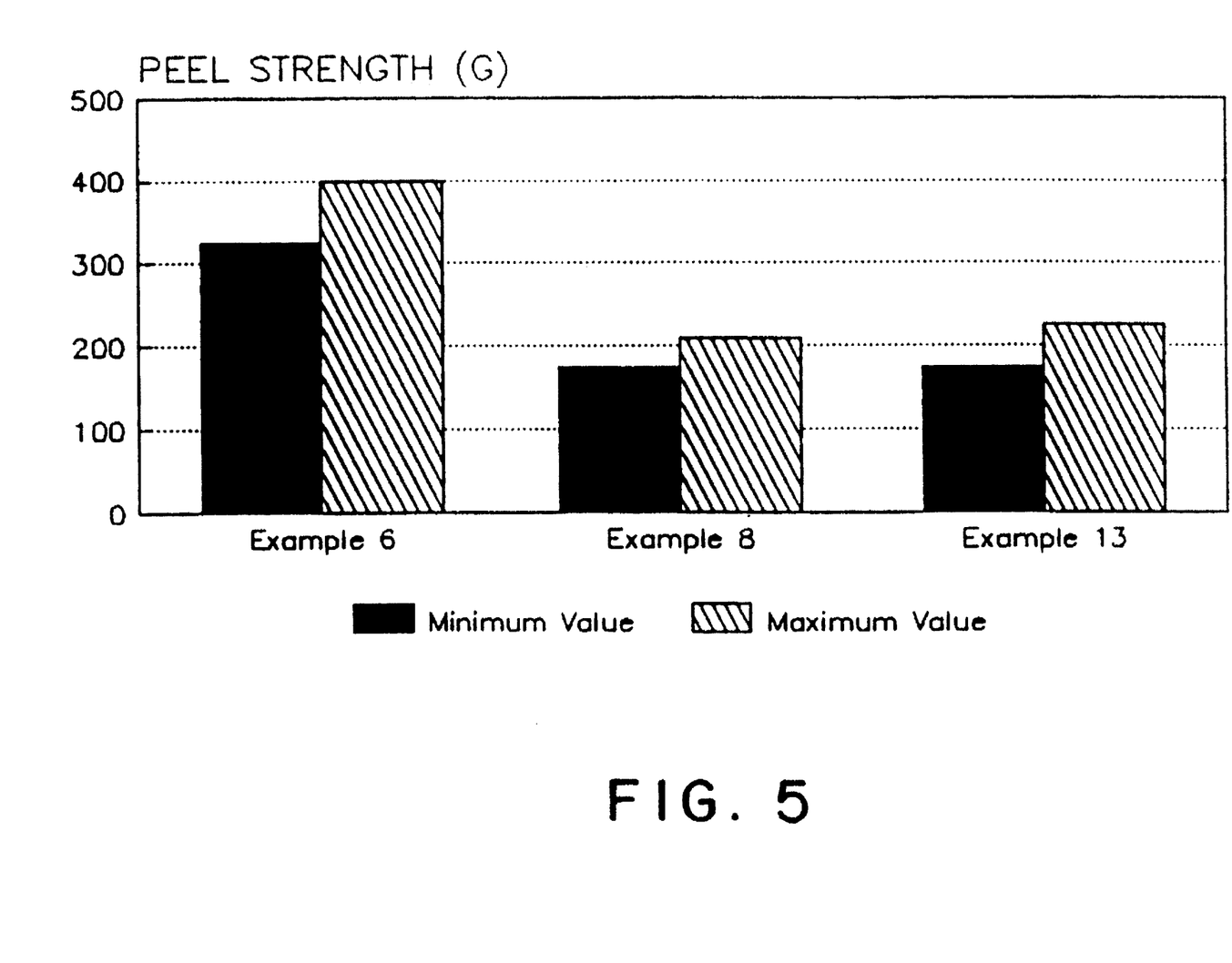
Figure 6:
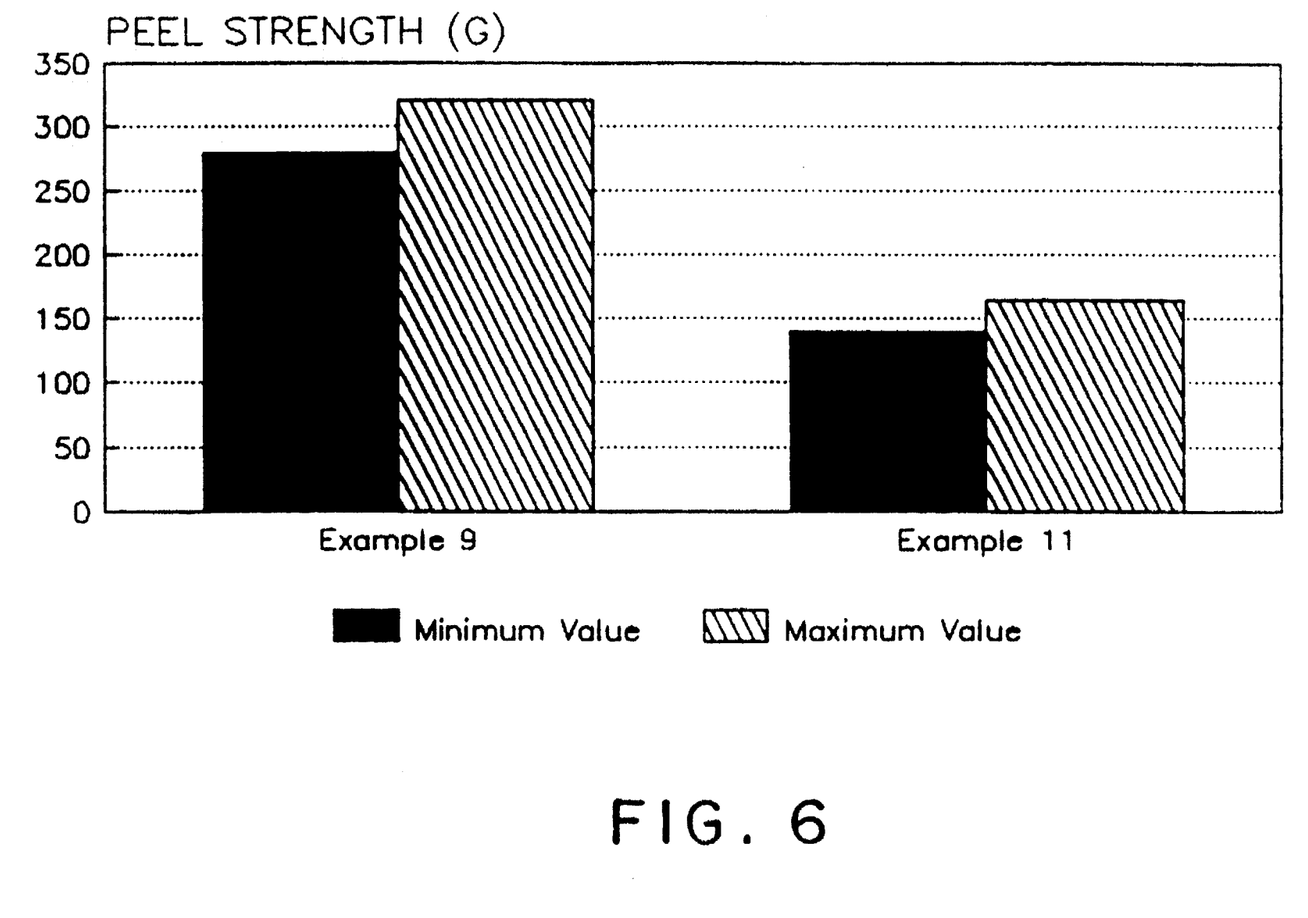
Figure 7:
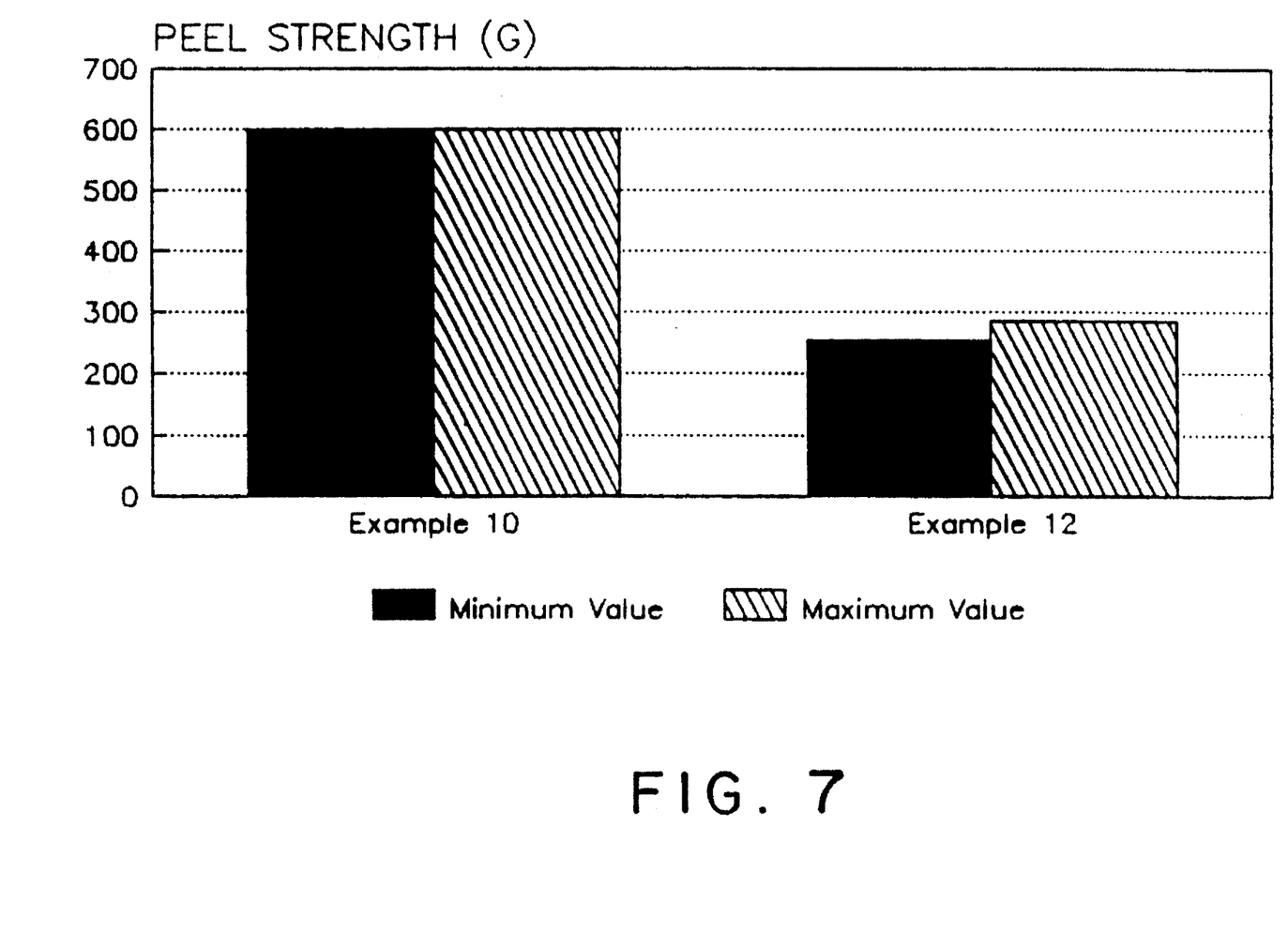

To better illustrate the improvements in peel strength which result from the present invention, the data in Table 4 were plotted as bar graphs as shown in FIGS. 2–7, inclusive. FIG. 2 compares the peel strength of the laminate prepared in Example 1 with the laminates of Examples 3 and 13. Example 1 was prepared with the excimer lamp, while Example 3 was prepared with a fusion lamp. Example 13, it will be recalled, is a laminate prepared with a thermally cured adhesive. FIG. 3 compares the peel strengths of the laminates of Examples 2, 4, and 13; the laminate of Example 2 was prepared with the excimer lamp, whereas the laminate of Example 4 was prepared with a fusion lamp. The peel strengths of the laminates of Examples 5, 7, and 13 are compared in FIG. 4. The laminates of Examples 5 and 7 were prepared with the excimer lamp and with a fusion lamp, respectively. The peel strengths of the laminates of Examples 6, 8, and 13 are compared in FIG. 5. The laminates of Examples 6 and 8 were prepared with the excimer lamp and with a fusion lamp, respectively. FIG. 6 compares the peel strengths of the laminates of Examples 9 and 11, with the laminate of Example 9 being prepared with the excimer lamp and the laminate of Example 11 being prepared with a fusion lamp. Finally, FIG. 7 compares the peel strength of the laminate of Example 10 with that of the laminate of Example 12. The laminates of Examples 10 and 12 were prepared with the excimer lamp and a fusion lamp, respectively.

The laminates of Examples 1–8, inclusive, and Example 13 each consisted of a central polypropylene spunbonded web sandwiched between two tissue webs. In every instance, the laminate produced with the excimer lamp had a peel strength greater than the laminate produced with the fusion lamp, typically from roughly 50 to about 100 percent greater. In addition, the laminates produced with the excimer lamp had peel strengths equal to or greater than the peel strength of the laminate produced with the thermally cured adhesive. Note that the method of the present invention is capable of producing laminates having improvements in peel strength of up to about 100 percent. No doubt optimization of the method of the present invention will produce even greater improvements. When the central spunbonded web was replaced with a polypropylene film, the laminates produced with the excimer lamp had peel strengths substantially greater than the peel strengths of laminates prepared with a fusion lamp, i.e., of the order of 100 percent greater.

The procedure described above with the excimer lamps was repeated, except that the first sheet material was Exxair 10-B-04 polyethylene microporous film (supplied by Exxon Corporation, Houston, Tex.), the second sheet material was the spunbonded web (i.e., center sheet material A) used in Examples 1–8 and 13, and a third sheet material was not employed, thereby giving a two-layer laminate. Similar results were obtained.

Having thus described the invention, numerous changes and modifications hereof will be readily apparent to those having ordinary skill in the art without departing from the spirit or scope of the invention.

What is claimed is:

1. A method of preparing a laminate composed of at least two layers of sheet materials which involves:
   (A) applying an adhesive composition to a surface of a first sheet material;
   (B) exposing the adhesive composition on the surface of said first sheet material to incoherent, pulsed ultraviolet radiation from a dielectric barrier discharge excimer lamp;
   (C) bringing a surface of a second sheet material in contact with the adhesive composition-bearing surface of said first sheet material; and
   (D) allowing said adhesive composition to cure; in which:
      (1) said incoherent, pulsed ultraviolet radiation has a single narrow wavelength band within the range of from about 260 to about 360 nanometers; and
      (2) said adhesive composition comprises from about 94 to about 60 percent by weight of a cycloaliphatic diepoxide, from about 1 to about 10 percent by weight of a cationic photoinitiator, and from about 5 to about 30 percent by weight of a vinyl chloride-vinyl acetate-vinyl alcohol terpolymer, all based on the weight of adhesive composition.

2. The method of claim 1, in which each of said first and second sheet materials independently is a film or fibrous sheet material.

3. The method of claim 2, in which a fibrous sheet material is selected from the group consisting of nonwoven webs comprised of cellulosic fibers, polyolefin fibers, or a mixture of cellulosic fibers and polyolefin fibers.

4. The method of claim 3, in which said nonwoven webs are selected from the group consisting of tissue webs, meltblown webs, coformed webs, and spunbonded webs.

5. The method of claim 1, in which said cationic photoinitiator is selected from the group consisting of arylsulfonium salts.

6. The method of claim 5, in which said cationic photoinitiator is a triarylsulfonium salt.

7. The method of claim 1, in which said terpolymer has a molecular weight in the range of from about 15,000 to about 30,000.

8. The method of claim 1, in which said incoherent, pulsed ultraviolet radiation has a single narrow wavelength band at 308 nanometers.

9. The method of claim 2, in which said laminate consists essentially of a first sheet material and a second sheet material.

10. The method of claim 9, in which said first sheet material is a film and said second sheet material is a nonwoven web.

11. The method of claim 10, in which said film is a microporous polyethylene film and said second sheet material is a tissue web.

12. The method of claim 10, in which said first sheet material is a polypropylene film and said second sheet material is a polypropylene spunbonded web.

13. A method of preparing a laminate of three sheets which comprises:
   (A) providing a first sheet having a first surface and a second surface;
   (B) applying an adhesive composition to each of said first surface and said second surface of said first sheet;
   (c) exposing the adhesive composition on each of said first surface and said second surface of said first sheet to incoherent, pulsed ultraviolet radiation from a dielectric barrier discharge excimer lamp;
   (D) bringing a surface of a second sheet in contact with the adhesive composition-bearing first surface of said first sheet;
   (E) bringing a surface of a third sheet in contact with the adhesive composition-bearing second surface of said first sheet; and
   (D) allowing the adhesive composition to cure; in which:
      (1) said incoherent, pulsed ultraviolet radiation has a single narrow wavelength band within the range of from about 260 to about 360 nanometers; and
      (2) said adhesive composition comprises from about 94 to about 60 percent by weight of a cycloaliphatic diepoxide, from about 1 to about 10 percent by weight of a cationic photoinitiator, and from about 5 to about 30 percent by weight of a vinyl chloride-vinyl acetate-vinyl alcohol terpolymer, all based on the weight of said adhesive composition.

14. The method of claim 13, in which each of said first, second, and third sheet materials independently is a film or fibrous sheet material.

15. The method of claim 14, in which a fibrous sheet material is selected from the group consisting of nonwoven webs comprised of cellulosic fibers, polyolefin fibers, or a mixture of cellulosic fibers and polyolefin fibers.

16. The method of claim 15, in which said nonwoven webs are selected from the group consisting of tissue webs, meltblown webs, coformed webs, and spunbonded webs.

17. The method of claim 13, in which said cationic photoinitiator is selected from the group consisting of arylsulfonium salts.

18. The method of claim 17, in which said cationic photoinitiator is a triarylsulfonium salt.

19. The method of claim 13, in which said terpolymer has a molecular weight in the range of from about 15,000 to about 30,000.

20. The method of claim 13, in which said incoherent, pulsed ultraviolet radiation has a single narrow wavelength band at 308 nanometers.

* * * * *